United States Patent
Lee et al.

(10) Patent No.: US 12,397,825 B2
(45) Date of Patent: Aug. 26, 2025

(54) AUTONOMOUS DRIVING SAFETY SYSTEM FOR SHARING RISK-BASED OPERATION DESIGN DOMAIN AND METHOD THEREOF

(71) Applicant: KIAPI (Korea Intelligent Automotive Parts Promotion Institute), Daegu (KR)

(72) Inventors: Myung Su Lee, Daegu (KR); Tae Hyeong Kim, Daegu (KR); Bong Seob Kim, Daegu (KR); Tae Ho Lim, Daegu (KR); Kyung Su Yun, Daegu (KR)

(73) Assignee: KIAPI (KOREA INTELLIGENT AUTOMOTIVE PARTS PROMOTION INSTITUTE), Daegu (KR)

( * ) Notice: Subject to any disclaimer, the term of this patent is extended or adjusted under 35 U.S.C. 154(b) by 229 days.

(21) Appl. No.: 18/203,176

(22) Filed: May 30, 2023

(65) Prior Publication Data

US 2024/0157971 A1    May 16, 2024

(30) Foreign Application Priority Data

Nov. 9, 2022   (KR) ........................ 10-2022-0148668

(51) Int. Cl.
*B60W 60/00*   (2020.01)

(52) U.S. Cl.
CPC ..... *B60W 60/0015* (2020.02); *B60W 2552/05* (2020.02); *B60W 2552/10* (2020.02);
(Continued)

(58) Field of Classification Search
CPC ......... B60W 60/0015; B60W 2552/05; B60W 2552/10; B60W 2552/30; B60W 2552/40;
(Continued)

(56) References Cited

U.S. PATENT DOCUMENTS

| 2021/0223788 A1 | 7/2021 | Garcia et al. |
| 2022/0161816 A1* | 5/2022 | Gyllenhammar ...... G06V 20/56 |

(Continued)

FOREIGN PATENT DOCUMENTS

| CN | 114407915 A | 4/2022 |
| EP | 4 050 583 A1 | 8/2022 |

(Continued)

OTHER PUBLICATIONS

Yoo Su Jung, Apr. 11, 2018, English Machine Translation_KR 2019-0124120 provided by Patent Translate by EPO and Google (Year: 2018).*

(Continued)

*Primary Examiner* — Ashley L Redhead, Jr.
(74) *Attorney, Agent, or Firm* — The PL Law Group, PLLC

(57) ABSTRACT

An autonomous driving safety system for sharing a risk-based operation design domain includes an autonomous driving system configured to control a vehicle driving unit according to information detected by a sensor unit to perform autonomous driving, in which the autonomous driving system includes an operation design domain update unit configured to evaluate a risk of at least one of a static operation design domain and a dynamic operation design domain recognized by the sensor unit while driving to update the operation design domain.

16 Claims, 5 Drawing Sheets

(52) U.S. Cl.
CPC ..... *B60W 2552/30* (2020.02); *B60W 2552/40* (2020.02); *B60W 2554/20* (2020.02); *B60W 2554/40* (2020.02); *B60W 2554/4029* (2020.02); *B60W 2554/804* (2020.02); *B60W 2555/20* (2020.02); *B60W 2555/60* (2020.02); *B60W 2556/10* (2020.02); *B60W 2556/45* (2020.02)

(58) Field of Classification Search
CPC ......... B60W 2554/20; B60W 2554/40; B60W 2554/4029; B60W 2554/804; B60W 2555/20; B60W 2555/60; B60W 2556/10; B60W 2556/45; G08G 1/096716; G08G 1/096783; G08G 1/0116; G08G 1/0129; G08G 1/0133; G08G 1/0141; G08G 1/096725; G08G 1/096741; G08G 1/096775; G08G 1/0112
See application file for complete search history.

(56) References Cited

U.S. PATENT DOCUMENTS

| | | | |
|---|---|---|---|
| 2022/0289252 A1 | 9/2022 | Liu et al. | |
| 2023/0140569 A1* | 5/2023 | Foster | B60W 60/0017 701/400 |
| 2023/0264719 A1* | 8/2023 | Yang | B60W 60/0015 701/23 |

FOREIGN PATENT DOCUMENTS

| | | | |
|---|---|---|---|
| JP | 2018-207154 A | | 12/2018 |
| JP | 2021-068132 A | | 4/2021 |
| JP | 2022-164696 A | | 10/2022 |
| KR | 0201900124120 | * | 4/2018 |
| KR | 20200010654 | * | 6/2018 |
| KR | 10-2019-0124120 A | | 11/2019 |
| KR | 10-2020-0010654 A | | 1/2020 |
| KR | 10-2020-0101517 A | | 8/2020 |
| KR | 20220067874 | * | 11/2020 |
| KR | 20220100128 | * | 1/2021 |
| KR | 10-2022-0067874 A | | 5/2022 |
| KR | 10-2022-0100128 A | | 7/2022 |
| WO | WO 2020/257642 A1 | | 12/2020 |
| WO | WO 2021/252174 A1 | | 12/2021 |
| WO | WO 2022/054712 A1 | | 3/2022 |

OTHER PUBLICATIONS

Mok Yeonkweon, Jan. 7, 2021, English Machine Translation_KR 2022-0100128 provided by Patent Translate by EPO and Google (Year: 2021).*

Yun Ilsoo, Nov. 18, 2020, English Machine Translation_KR 2022-0067874 provided by Patent Translate by EPO and Google (Year: 2020).*

Chung Sung Mun, Jun. 29, 2018, English Machine Translation_KR 2020-0010654 provided by Patent Translate by EPO and Google (Year: 2018).*

European Search Report For EP23179382.9 issued on Apr. 11, 2024 from European patent office in a counterpart European patent application.

Office action issued on Feb. 7, 2023 from Korean Patent Office in a counterpart Korean Patent Application No. 10-2022-0148668 (English translation is also submitted herewith.).

Office action issued on Jul. 30, 2024 from Japan Intellectual Property Office in a counterpart Japanese Patent Application No. 2023-096321 (English translation is also submitted herewith.).

Office action issued on Jan. 21, 2025 from Japan Intellectual Property Office in a counterpart Japanese Patent Application No. 2023-096321 (English translation is also submitted herewith.).

Office action issued on Jun. 20, 2025 from Japan Intellectual Property Office in a counterpart Japanese Patent Application No. 2023-096321 (English translation is also submitted herewith.).

* cited by examiner

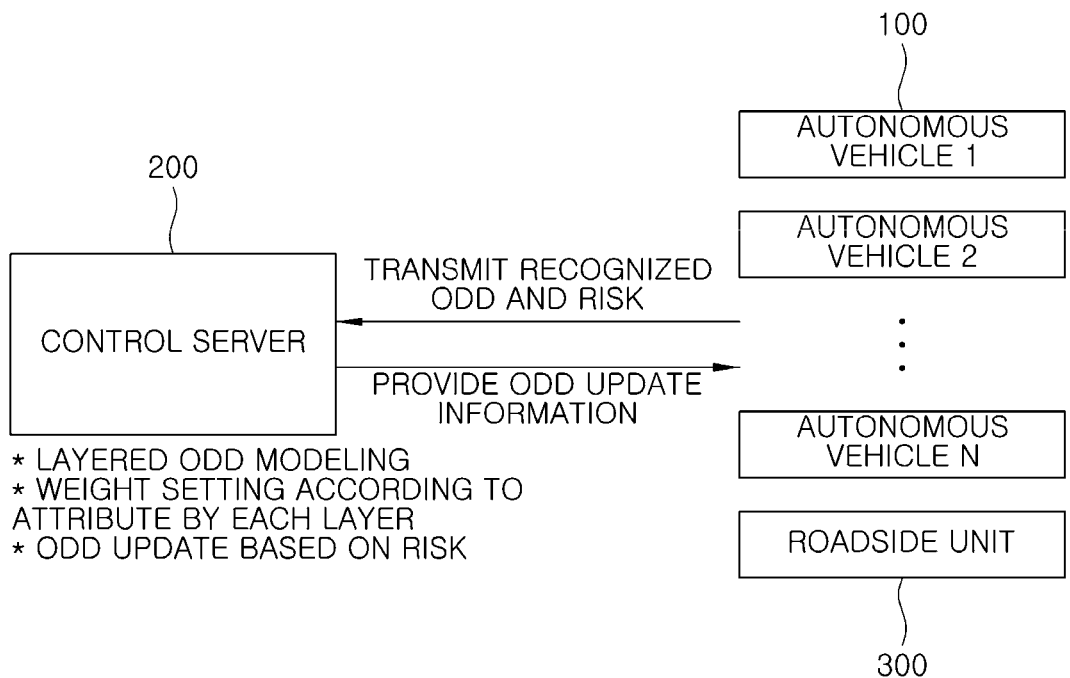
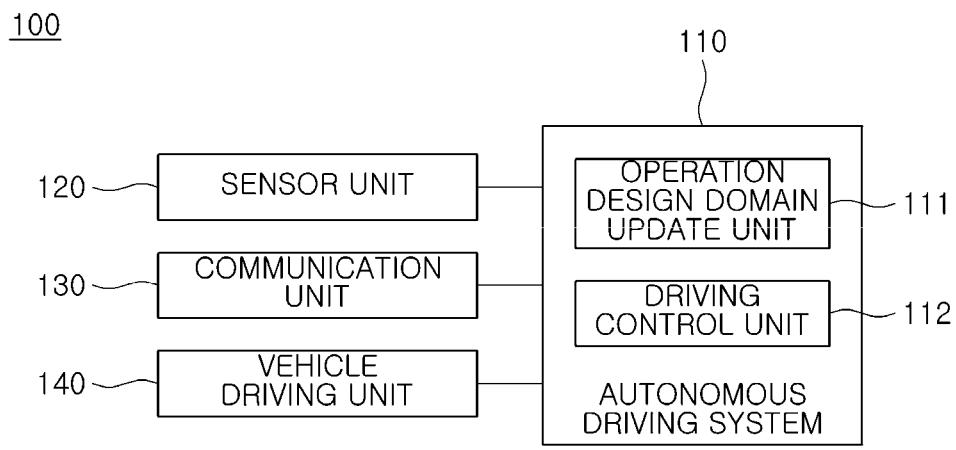

AUTONOMOUS DRIVING SAFETY SYSTEM FOR SHARING RISK-BASED OPERATION DESIGN DOMAIN AND METHOD THEREOF

CROSS-REFERENCE TO RELATED APPLICATION AND CLAIM OF PRIORITY

This application claims the benefit under 35 USC § 119 of Korean Patent Application No. 10-2022-0148668, filed on Nov. 9, 2022, in the Korean Intellectual Property Office, the entire disclosure of which is incorporated herein by reference for all purposes.

BACKGROUND

1. Field

The present disclosure relates to an autonomous driving safety system for sharing a risk-based operation design domain and a method thereof capable of designing a risk-based operation design domain and sharing the designed operation design domain through an edge infrastructure.

2. Description of Related Art

According to Ministry of Land, Infrastructure and Transport "Level 4 autonomous vehicle production safety guidelines" defines an operation design domain (ODD) as an operation domain (road, weather, traffic, etc.) in which a function of an autonomous driving system may be performed normally and safely, and recommends to clearly present the operation design domain related to a safe operation of autonomous driving system.

In addition, the above safety guideline clearly presents the operation design domain and at the same time, presents status information of the system when it is out of the operation design domain, and includes a road type, a geographical range, a weather environment, a speed range, and other constraints in the operation design domain.

In addition, according to NHTSA's Automated driving systems: A Vision for Safety 2.0 in the United States, each autonomous driving system (ADS) recommends to define and document an ODD for testing or deployment to be used on public roads.

In addition, the operation design domain (ODD) should describe specific conditions under which the given ADS or function is intended to operate, and the ADS should be able to operate safely within the designed ODD.

However, the operation design domain (ODD) recommends designing the operation design domain (ODD) to secure autonomous driving operation and functional safety based on real roads, but is a part requiring complementary settings such as classification for each layer and definition of detailed attribute values for the operation design domain (ODD).

In addition, an autonomous driving operation on a real road may be divided into a static operation design domain (static ODD) and a dynamic operation design domain (dynamic ODD). For example, width and lanes of roads, signs, and structures may be regarded as characteristics of static (static ODD) characteristics, and objects (people, vehicles, etc.) and a weather environment may be regarded as dynamic (dynamic ODD) characteristics.

The dynamic and static characteristics of the operation design domain (ODD) require updating and complementing initially designed ODD design according to a passage of time (changes in ODD characteristics according to day and night, structural deformation over time, etc.) and changes in traffic (traffic volume, unexpected objects, etc.).

However, in the related art, the lack of update of the operation design domain (ODD) or subsequent complementation after the update has become a factor that reduces safety.

In addition, since the operation design domain (ODD) has different design conditions and response strategies for each vehicle, there is a cumbersome problem of having to changing characteristics of different operation design domains (ODDs).

SUMMARY

The present disclosure has been derived to solve the above conventional problems, and an aspect of the present disclosure provides an autonomous driving safety system for sharing a risk-based operation design domain and a method thereof capable of securing autonomous driving safety by complementing different operation design domains (ODDs) for each autonomous vehicle using a method of calculating a risk of an operation design domain (ODD) and vehicle-to-vehicle communication technology.

The present disclosure may include the following embodiments in order to achieve one or more of the above aspects.

According to an embodiment of the present disclosure, there may be provided an autonomous driving safety system for sharing a risk-based operation design domain including: an autonomous driving system 110 configured to control a vehicle driving unit 140 according to information detected by a sensor unit 120 to perform autonomous driving, in which the autonomous driving system 110 includes an operation design domain (ODD) update unit 111 configured to evaluate a risk of at least one of a static operation design domain and a dynamic operation design domain recognized by the sensor unit 120 while driving to update the operation design domain (ODD).

The autonomous driving system may transmit the updated operation design domain (ODD) to at least one of a roadside unit, other autonomous vehicles, and a control server, and share the updated operation design domain (ODD).

The autonomous driving system may include: a layer-specific attribute information DB configured to layer the operation design domains into a plurality of layers and stores attributes for each layer and weights set for each attribute; a risk calculation module configured to calculate risks for each layer by applying the weight of the attributes stored in the layer-specific attribute information DB according to the recognized operation design domain, and calculates a final risk by summing the risks for each layer; and an update module configured to update the risk calculated by the risk calculation module to the operation design domain.

The autonomous driving system may be classified into: a road geometry layer that is classified into an operation design domain (ODD) of a road structure, a road type, a road shape and form, and a shape, type, and condition of a road surface; a social infrastructure layer that is classified into the operation design domain of a traffic signal and structure; a temporary restricted area layer that is classified into an unexpected situation caused by a traffic accident, a construction section, and an emergency stop vehicle, and an operation design domain of a protected zone; an object layer that is classified into an operation design domain of a static object, a dynamic object, and an unexpected object on and around a road; an environmental condition layer that is classified into an operation design domain of season, weather (climate), and a light source; and a connectivity (communication) layer that is classified into an operation design domain of communication and control.

The temporary restricted area layer may have an attribute set as at least one of a distance between start and end points of the protected zone and the autonomous vehicle, a type of protected zone, a distance between the autonomous vehicle and an unexpected section, left and right lane positions between the unexpected sections from the autonomous vehicle, a relative position of the unexpected section from autonomous vehicle, and a type of the unexpected section.

In addition, the operation design domain of a type of the road structure may have an attribute set as an accident rate and fatality, and the accident rate and fatality may be weighted differently depending on a degree of death and injury.

In addition, the operation design domain of the road shape may have an attribute set as at least one of a lane width, the total number of lanes on a road, a lane number on which the autonomous vehicle 100 is driving, a radius of curvature of a road, and a road design speed.

In addition, the operation design domain of the road surface may have an attribute set as at least one of a road surface material type, a road surface friction coefficient ($\mu$), a damage type, road surface damage severity (high, medium, low), and a distance between the autonomous vehicle and a road surface damage section.

In the above embodiment, a risk of the operation design domain of the type of the road structure may be calculated according to Equation below.

$$Risk = \frac{\text{fatal accident} \times 1 + \text{serious accident} \times 0.7 + \text{minor accident} \times 0.3}{\text{number of traffic accidents}}$$

In Equation above, a weight of 1 may be set for a fatal accident, a weight of 0.7 may be set for a serious accident, and a weight of 0.3 may be set for a minor accident.

The operation design domain of the weather may set a cloud ratio, a wind speed, precipitation, snowfall, a visibility range as an attribute, the cloud ratio may be set as a ratio occupied by clouds in sunny and cloudy conditions, and wind, rain, and snow may be classified and set into multiple categories based on the amount, and fog may be classified into multiple types based on the visibility range.

The object layer may be classified into an operation design domain of a vehicle, a pedestrian, and an animal, the operation design domain of the vehicle may have an attribute set as at least one of left/right lane positions of a target vehicle from the autonomous vehicle, a surrounding position of the target vehicle from the autonomous vehicle, an absolute speed (X and Y axes), a relative speed (X and Y axes) from the autonomous vehicle, a distance (X and Y axes), a travel angle (direction), detection coordinates, and a type of a vehicle, and the operation design domain of the pedestrian and animal may have an attribute set as at least one of the relative speed, absolute speed, distance, travel angle, detection coordinates, and type from the autonomous vehicle.

In the above embodiment, a risk of the operation design domain of the road shape may be calculated by Equation below.

$$\text{Risk of road shape} = AMF_{curve\ radius} \times AMF_{longitudinal\ slope}$$

The curve radius may be a curve radius of a road, and the longitudinal slope is a longitudinal slope of a road.

According to another embodiment of the present disclosure, there may be provided an autonomous driving safety system for sharing a risk-based operation design domain including: a control server configured to collect an operation design domain (ODD) from a plurality of autonomous vehicles and roadside units in real time, in which the control server may transmit an operation design domain (ODD) including risk to the plurality of autonomous vehicles and roadside units to update the operation design domain.

The control server may receive the risk-based operation design domain from the autonomous vehicle, and compare and evaluate the collected operation design domain to transmit the updated operation design domain to the autonomous vehicle in which the risk is missing or erroneous.

The control server may include: an information collection unit configured to collect an operation design domain (ODD) and road and surrounding situation information from the plurality of roadside units and autonomous vehicles; an operation design domain design unit configured to model an operation design domain including at least one of a static operation design domain and a dynamic operation design domain collected from the autonomous vehicle; and a server communication unit configured to transmit the operation design domain (ODD) modeled by the operation design domain design unit to the plurality of autonomous vehicles and roadside units.

BRIEF DESCRIPTION OF THE DRAWINGS

FIG. 1 is a block diagram schematically illustrating an autonomous driving safety system for sharing a risk-based operation design domain and a method thereof according to the present disclosure.

FIG. 2 is a block diagram of an autonomous vehicle in the present disclosure.

DETAILED DESCRIPTION

Figure 3:
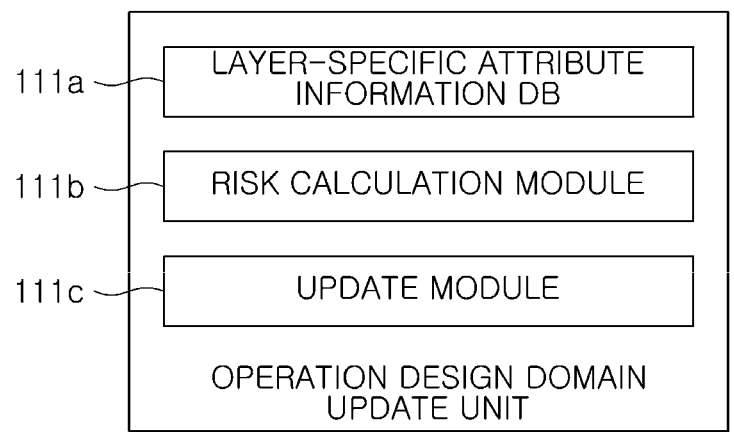
FIG. 3 is a block diagram illustrating an operation design domain update unit.

The present disclosure may be variously modified and have several exemplary embodiments. Therefore, specific exemplary embodiments of the present disclosure will be illustrated in the accompanying drawings and be described in detail. This is not intended to limit the present disclosure to specific embodiments, and it should be understood that this corresponds to any one of all modifications, equivalents or substitutes included in the spirit and scope of the present disclosure for connecting and/or fixing structures extending in different directions.

Terms used in the present specification are used only in order to describe specific exemplary embodiments rather than limiting the present disclosure. Singular forms are intended to include plural forms unless the context clearly indicates otherwise.

It should be further understood that terms "include" or "have" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

An operation design domain (ODD) in this specification refers to an automated domain (e.g., road, weather, traffic, etc.) where functions of an autonomous driving system may be performed normally and safely, as suggested by the Ministry of Land, Infrastructure and Transport's "Level 4 Autonomous Vehicle Manufacturing, Safety Guidelines."

Hereinafter, preferred embodiments of an autonomous driving safety system for sharing a risk-based operation design domain and a method thereof according to the present disclosure will be described with reference to the accompanying drawings.

FIG. 1 is a block diagram schematically illustrating an autonomous driving safety system for sharing a risk-based operation design domain and a method thereof according to the present disclosure.

Referring to FIG. 1, the present disclosure may include a control server 200, a plurality of autonomous vehicles 100, and a roadside unit 300.

The plurality of autonomous vehicles 100 may autonomously drive on a road while detecting situations of a roadside, recognize elements of an operation design domain (ODD) while driving to evaluate risk, update the operation design domain with the risk, share the updated operation design domain through infrastructure (e.g., edge infrastructure). A detailed configuration description thereof will be described later.

A roadside unit (RSU) is composed of a plurality of devices capable of communicating and generating and transmitting/receiving traffic information so as to configure, for example, a V2X infrastructure, and is well known.

Here, the roadside unit 300 may share information through an autonomous vehicle and infrastructure, and may relay the shared information to an autonomous vehicle capable of communication, other roadside units 300, and a control server 200 of a control center.

The control server 200 collects information of operation design domains (ODDs) from an autonomous vehicle and a roadside unit in real time, and compares and evaluates the information of the collected operation design domains (ODD). In addition, the control server 200 transmits the updated operation design domain to an autonomous vehicle in which an error or omission of risk for the operation design domain (ODD) is found among the autonomous vehicles to update the operation design domain of the corresponding autonomous vehicle.

Here, the control server 200 may model a risk-based operation design domain, and compare and evaluate operation design domains of autonomous vehicles collected based on the result.

For example, autonomous vehicles have operation design domains (static operation design domain and dynamic operation design domain) set according to different formats and standards depending on manufacturers or vehicle models, and some or all of the autonomous vehicles should update their own initially designed operation design domains (ODDs) according to a passage of time (change in characteristics of the operation design domain according to day and night, deformation of structures over time, etc.) and a change in traffic (traffic volume, unexpected objects, etc.).

However, the operation design domain may not be updated due to various factors, such as individual circumstances of vehicle owners, a difference in autonomous driving systems, a difference in vehicle models, and circumstances of manufacturers.

Therefore, the control server 200 transmits an operation design domain (ODD) designed according to the up-to-date information to the autonomous vehicle 100 in which an operation design domain (ODD) that does not match the current situation is set. In this case, the updated operation design domain (ODD) may be received through autonomous vehicle 100 and/or infrastructure, or may be designed by the control server itself.

Preferably, the control server 200 may compare and evaluate the operation design domain (ODD) designed by itself and the operation design domain (ODD) of the received autonomous vehicle 100 to calculate the up-to-date information, and transmit the calculated up-to-date information to the autonomous vehicle, the roadside unit 300, etc., that are not updated to the corresponding operation design domain (ODD).

FIG. 2 is a block diagram of an autonomous vehicle in the present disclosure.

Referring to FIG. 2, the autonomous vehicle 100 includes an autonomous driving system 110, a sensor unit 120, a communication unit 130, and a vehicle driving unit 140.

The sensor unit 120 is composed of a plurality of sensors capable of detecting objects or surrounding conditions in front and rear and/or left and right sides of the autonomous vehicle 100, such as a Lidar sensor, a radar sensor, temperature, humidity, and a rain sensor.

The communication unit 130 performs communication with the control server 200, the roadside unit 300, and other autonomous vehicles 100.

The vehicle driving unit 140 is composed of devices that perform unique functions of a vehicle, such as steering, driving, deceleration, and braking. Here, the vehicle driving unit 140 is operated under the control of the autonomous driving system 110.

The autonomous driving system 110 includes a driving control unit 112 that performs autonomous driving by controlling the vehicle driving unit 140 through scenarios set according to various situations and information detected by the sensor unit 120, and an operation design domain update unit 111 that evaluates and updates the risk of the recognized operation design domain (ODD).

The driving control unit 112 corresponds to the known autonomous driving system 110 and sets a route to the input destination and controls the vehicle driving unit 140 to perform autonomous driving. Here, the driving control unit 112 controls a vehicle driving unit 140 through a scenario that is set according to various surrounding environments, such as weather (snow, rain, and fog) detected while driving, road surface conditions (wetting, drying, freezing, and damage), unexpected objects (vehicle, pedestrian, animal, rock fall on a road), and road structures (tunnel, second lane, third lane, overpass, back road, pavement, non-pavement), and static or dynamic operation design domains D1, D2, and D3 (see FIG. 9) detected in real time.

The operation design domain update unit 111 models the static or dynamic operation design domain detected by the sensor unit 120 based on risk to update the operation design domain. In addition, the operation design domain update unit 111 updates the shared operation design domain (ODD) from other autonomous vehicles 100 and/or the control server 200 through the communication unit 130 to the up-to-date operation design domain according to the passage of time and the change in traffic.

The operation design domain update unit 111 will be described with reference to FIG. 3.

FIG. 3 is a block diagram illustrating an operation design domain update unit.

Referring to FIG. 3, the operation design domain update unit 111 may include a layer-specific attribute information DB 111a storing attribute information of the operation design domain, a risk calculation module 111b, and an update module 111c.

The layer-specific attribute information DB 111a layers the operation design domains (ODDs) and stores attribute and weight information set for each layer.

In the present disclosure, the operation design domain (ODD) is layered into 6-layers, and each layer is divided into a single layer. The risk was defined as the total risk of each single layer.

As shown in Table 1 below, the classification of the operation design domains for each layer classifies each layer into road geometry, social infrastructure, a temporary restricted area, an object, an environmental condition, and connectivity (communication), and classifies operation design domain for each layer.

TABLE 1

| 6-Layer | Operation design domain classification |
|---|---|
| Layer 1: Road geometry | Road structure (type) |
| | Road shape (form) |
| | Road surface (condition) |
| Layer 2: Infrastructure | Traffic signal |
| | Structure |
| Layer 3: Temporary restricted area | General |
| | Unexpected situation |
| Layer 4: Object | Object (static, dynamic, unexpected) |
| Layer 5: Environmental condition | Season |
| | Weather (Climate) |
| | Light source |
| Layer 6: Connectivity | V2X (Edge Infra) |
| | Control |
| | Others |

In addition, the present disclosure classifies operation design domains for each layer into large, medium, and small categories by applying criteria such as type, shape, state, and kind, and sets attributes for judgment of risk evaluation for each small category. Tables 2 to 7 below are classification tables in which attributes for each layer in Table 1 are set. Specifically, Table 2 describes the road geometry layer, Table 3 describes the infrastructure layer, Table 4 describes the temporary restricted area layer, Table 5 describes the object layer, Table 6 describes the environment, and Table 7 describes the detailed classification and properties of the connectivity (communication) layer.

TABLE 2

| Large category | Medium category | Small category | | Attribute |
|---|---|---|---|---|
| Road geometry (L1) | Road structure[1] (type) (L1-1) | Single road, Intersection, Auxiliary, Others (ex, back road) | | Accident rate Fatality |
| | Road shape (form) (L1-2) | Lane | Single lane | Lane width |
| | | | Multi-lane | Total number of lanes on road |
| | | | | Lane number on which Ego vehicle is driving |
| | | Characteristic | Curvature | Radius of curvature of road Road design speed |
| | | | Slope | Road type (flatland, mountainous district, etc.) |
| | | | | Longitudinal slope |
| | | | | Road design speed |
| | Road surface (condition) (L1-3) | Pavement Road surface condition | | Road surface material type |
| | | | | Road surface friction coefficient ($\mu$) |
| | | | | Damage type (potholes, cracks, etc.) |
| | | | | Road surface damage severity (good, average, bad) |
| | | | | Distance between Ego vehicle and damaged road surface |
| | | Lane | | Lane condition |
| | | | | Lane type |
| | | | | Land parameter (offset, heading angle, etc.) |
| | | | | Left/right position of lane from Ego vehicle |
| | | | | Lane condition abnormal (unclear) |

Among the contents of Table 2, the attributes of the operation design domain for the road structure are set as accident rate and fatality, so the risk is calculated according to the accident rates and fatalities for each road section. The risks according to the risk factors of the road structure are shown in Table 2-1 below. Table 2-1 classifies the fatality rates for each road section, Ministry of Land, Infrastructure and Transport standards, and risk sections for each EPDO.

TABLE 2-1

| Score | Risk level | Fatality rate | Ministry of Land, Infrastructure and Transport standard | EPDO |
| --- | --- | --- | --- | --- |
| 1 | Common | 0 to less than 0.8 | 6.05 to less than 6.82 | 0 to less than 1.42 |
| 2 | Caution | 0.8 to less than 1.6 | 6.82 to less than 7.59 | 1.42 to less than 2.85 |
| 3 | Somewhat risk | 1.6 to less than 2.4 | 7.59 to less than 8.37 | 2.85 to less than 4.27 |
| 4 | Risk | 2.4 to less than 3.2 | 8.37 to less than 9.14 | 4.27 to less than 5.70 |
| 5 | Very risk | 3.2 to 4.0 or more | 9.14 to 9.91 or more | 5.70 to 7.12 or more |

In addition, the operation design domain of the type (single road, intersection, back road, etc.) of road structure is classified by type of single roads such as in tunnel, on bridge, over overpass, underpass, and back road, and intersections such as 3-way, 4-way, multiple, and rotation intersections. The risk may be calculated by combining the fatality rates, the EPDO, and the Ministry of Land, Infrastructure and Transport standards for each type.

In addition, the operation design domain of the road shape (form) sets a lane width according to a curvature or slope of a lane and each road, the total number of lanes on a road, a radius of curvature of a road, a road design speed, a road type (flatland or mountainous district) longitudinal slope, and a road design speed as attributes.

With these attributes, risk may take into account the radius of curvature, the longitudinal slope, and the driving speed. For example, risk may be calculated according to the radius of curvature and longitudinal slope of the current road on which the autonomous vehicle 100 is driving, and the current driving speed of the autonomous vehicle 100. An example thereof is introduced in Table 2-2 below.

TABLE 2-2

| Risk grade | AMF | Curve radius | Driving speed |
| --- | --- | --- | --- |
| Highway (100 km, longitudinal slope 5%) risk grade by driving speed | | | |
| 1 | 1~1.1876 | 460 m | Less than 68 km/h |

TABLE 2-2-continued

| Risk grade | AMF | Curve radius | Driving speed |
| --- | --- | --- | --- |
| Highway (100 km, longitudinal slope 5%) risk grade by driving speed | | | |
| 2 | 1.1877~1.3752 | | 68 to less than 83 km/h |
| 3 | 1.3753~1.5628 | | 80 to less than 90 km/h |
| 4 | 1.5629~1.7504 | | 90 to less than 95 km/h |
| 5 | 1.7505 or more | | 95 km/h or more |

Table 2-2 above sets risk grades for each driving speed on a highway with a longitudinal slope of 5%, and the risk is set high when the driving speed and the longitudinal slope AMF values are low.

In addition, the operation design domain of the road surface and condition is classified into a pavement, a road surface condition, and a lane. Among those, the road surface friction coefficient according to the type (e.g., asphalt, concrete, block, non-pavement) of pavement is set as an attribute.

Among those, the road surface conditions are subdivided into drying, wetting, snowfall, freezing, and damage. Among those, the drying, wetting, snowfall, and freezing sets the road surface friction coefficient as an attribute. The friction coefficients of the drying, wetting, snowfall, and freezing may have different values depending on the type of pavement.

For example, for the road surface friction coefficients, an asphalt paved road may be assigned attributes of drying (0.8), wetting (0.6 to 0.7), snowfall (0.3 to 0.6), and freezing (0.05 to 0.3), a concrete paved road may be assigned attributes of drying (0.8), wetting (0.4 to 0.6), snowfall (0.3 to 0.6), and freezing (0.05 to 0.3), a block paved road may be assigned attributes of drying (0.7), wetting (0.3 to 0.4), snowfall (0.3 to 0.6), and freezing (0.05 to 0.2), and unpaved road may be assigned may be assigned attributes of drying (0.5), wetting (0.3 to 0.4), snowfall (0.3 to 0.6), and freezing (0.05 to 0.2).

The above friction coefficient is applied to a calculation of a stoppable distance for each driving speed while driving on the road under the corresponding road surface condition of the autonomous vehicle 100. The calculated stoppable distance is applied as an evaluation criterion for the risk calculation.

Attributes of a lane type (e.g., solid line, dotted line, double solid line, solid line, dotted line, zigzag lane, bus only lane), left/right positions of a lane in the autonomous vehicle 100, a lane condition (normal or abnormal) are set for a lane. Here, the abnormality of the lane condition means a situation in which the lane is not clearly visually confirmed, such as disappearance or obscurity of a lane.

Table 3 below subdivides the social infrastructure layer and sets the attributes according to each classification.

TABLE 3

| Large category | Medium category | | Small category | Attribute |
| --- | --- | --- | --- | --- |
| Infrastructure (L2) | Traffic signal (L2-1) | Regulatory sign | Caution sign Directional regulation, No entry, Speed limit | Sign type Sign details Distance [m] Sign |

TABLE 3-continued

| Large category | Medium category | Small category | | Attribute |
|---|---|---|---|---|
| | | Indication sign | Exclusive road Directional indication Parking, Stop Protection indication | coordinates [X, Y] |
| | | Road surface sign | Prohibited, Center line, U-turn zone line, Lane, Bus-only lane, Road edge zone line, Restricted lane, Road barrier, Speed limit, Slow speed, Temporary stop, Concession, Guide line, Stop line, Safety zone, Crosswalk, Protected zone, Heading direction, Lane change, Slope, Auxiliary sign, Signal | Road surface marking type Road surface marking details Distance [m] Sign coordinates [X, Y] |
| | Structure (L2-2) | Traffic signal sign | | Road facility type Distance and size [m] Structure coordinates [X, Y] |
| | | Guardrail Median strip Streetlight Bump Electric pole Cones Curb Manhole | | |

Among the above contents, the medium category of the traffic signal may be classified into a caution sign, an indication sign, and a road surface sign. Here, the caution sign includes caution signs such as a protected zone (e.g., crosswalks, children protection, wildlife protection), a slope (e.g., uphill, downhill), an accident risk zone, a habitual congestion section, left and right merge roads, left and right diverging roads, an intersection, a median strip start/end road width limit, disappearance of a lane, two way traffic, a speed bump, a priority road, a rock fall road, a construction section, a railway crossing, a tunnel, a bridge, and cross wind.

For the above caution sign, a regulatory sign and an indication sign each have attributes set as the type or details of the sign and the sign coordinates, respectively.

For the road marking, a road surface marking type, a road surface marking details, a distance, and sign coordinates were set as attributes.

In addition, as described in the above Table, the small category of the structure is subdivided into structures on and around a road, such as a traffic signal sign, a guardrail, a median strip, a streetlight, a bump, an electric pole, cones, a curb, and a manhole, and the attributes of each subclass were set as the type, distance, and size of the road facility, and structure coordinates.

The temporary restricted area layer is classified into a protected zone and an operation design domain related to an unexpected situation as shown in Table 4 below, and each attribute is set. Among those, the protected zones (e.g., silver zone, school zone, and school zone protected zone) have start and end points of each protected zone, a distance between the autonomous vehicle 100 and the corresponding protected zone, and the type (e.g., speed reduction, attention) of protected zone set as attributes.

TABLE 4

| Large category | Medium category | Small category | Attribute |
|---|---|---|---|
| Temporary restricted area (L3) | General (L3-1) | Protected zone (ex, silver zone, school zone, school zone protection area) | Distance between start/end point of protected zone and the Ego vehicle Protected zone type |
| | | Unexpected situation (ex, traffic accident, construction section, emergency stop vehicle) | Distance between Ego vehicle and unexpected section Position of left/right lanes in unexpected section from Ego vehicle Relative position: Surrounding position of unexpected section from Ego vehicle Type of unexpected section |

The unexpected situation means a traffic accident, a construction section, and an emergency stop vehicle, and attributes are set as a distance between an autonomous vehicle 100 and an unexpected section, a position of the unexpected section, a relative position, and a type of unexpected section.

The object layer includes an object that may appear while driving on the road, as shown in Table 5 below, and is classified into a vehicle, a pedestrian, an animal, etc.

TABLE 5

| Large category | Medium category | Small category | Attribute |
|---|---|---|---|
| Object(L4) | Object(L4-1) | Vehicle | Relative lane position (left/right lane position of target vehicle from the Ego vehicle), Relative position (surrounding position of target vehicle from Ego vehicle), Absolute speed (X and Y axes), Relative speed from Ego vehicle (X, Y axis), Distance (X, Y axis), Travel angle (direction), Detection coordinate (detection coordinate of object), Type (commercial, passenger, etc.) |
| | | pedestrian General Adult Elder Children Others (police officer, etc.) | Relative speed from Ego vehicle (X, Y axis), Absolute speed (X, Y axis), Distance (X, Y axis), Travel angle (direction), Detection coordinate (detection coordinate of object), Type (pedestrian, animal, etc.) |
| | | Animal Mammalia Birds Others | |

Among those, the vehicle includes, for example, a commercial vehicle, a passenger vehicle, agricultural machinery, a two-wheeled vehicle, a motor vehicle, a bicycle, a special vehicle, a truck, a police cars, and special vehicles such as a fire truck, and sets a relative lane position, a lane position, an absolute speed, a relative speed, a travel angle, detection coordinates, etc.

In addition, the pedestrian may also be classified as an adult, a senior, a child, and others, such as officials performing public duties such as police officers or workers during construction.

For the pedestrian and animal, the relative speed from the autonomous vehicle 100, the absolute speed, the distance, the travel angle, the detection coordinates, the type, etc., are set as attributes.

The environment layer is a layer for the road driving environment of the autonomous vehicle 100 and may be classified as season, weather, and a light source as shown in Table 6 below.

TABLE 6

| Large category | Medium category | Small category | Attribute |
|---|---|---|---|
| Environment(L5) | Season(L5-1) | Spring, summer, fall, winter | — |
| | Weather (climate) (L5-2) | Sunny | cloud ratio |
| | | Cloudy | |
| | | Wind | Wind speed |
| | | Rain | Precipitation |
| | | Snow | Snowfall |
| | | Fog | Visibility range |

TABLE 6-continued

| Large category | Medium category | Small category | | Attribute |
|---|---|---|---|---|
| | Light source(L5-3) | Natural | Dawn | Standard time: 00 to 06 hours |
| | | | Morning | Standard time: 06 to 09 hours |
| | | | Daytime | Standard time: 09 to 18 hours |
| | | | Evening | Standard time: 18 to 21 hours |
| | | | Night | Standard time: 21 to 24 hours |
| | | Artificial | Vehicle lamp (high beam, etc.) Traffic light Streetlight Others | — |

Among the above contents, a cloud ratio, a wind speed, precipitation, snowfall, and visibility range were set as attributes for weather. Here, the cloud ratio is a value for determining sunny and cloudy conditions as a cloud ratio. For example, for the sunny condition, an attribute is assigned as having clouds in the entire sky at a rate of 0 to 50%, and for the cloudy state, an attribute is assigned as having clouds at a rate of 9 to 10%.

In addition, among the weather attributes, wind is a wind speed (for example, strong: 25 m/s or more, middle: 20-25 m/s, low: 15 m/s) set as an attribute, rain is precipitation (for example, strong: 30 mm or more, middle: 15 to 30 mm, low 1 to 15 mm) set as an attribute, snow is snowfall (e.g., strong: 30 mm or more, medium: 15 to 30 mm, low: 1 to 15 mm) set as an attribute, and fog is a visibility range (e.g., strong: 40 m or less, medium 40 to 200 m, low: 200 to 1000 m) set as an attribute.

The connectivity (communication) layer is a layer for communication with the control server 200 and/or surrounding infrastructure for the operation of the autonomous driving system 110, and the classification and attributes are set as shown in Table 7 below.

TABLE 7

| ODD classification | Variable | Attribute |
|---|---|---|
| Connectivity/ communication(L6) | V2V | Communication rangeAverage throughput Packet error rate Average latency |
| | V2I | |
| | Edge Infra | |
| | Control | — |
| | Communication shadow area | Distance from shadow area Shadow area length |

The risk calculation module 111b models the operation design domain (ODD) based on risk depending on whether the static operation design domain or the dynamic operation design domain is recognized while driving, updates the operation design domain to suit the field, and reflects the updated operation design domain on the existing installed operation design domain. Such a risk calculation module will be described through an embodiment of calculating risk in a road geometry layer as an example.

The risk calculation module 111b may apply weights in risk calculation according to the attributes for each layer described above. Here, risk may be calculated through formula such as Equation 1 below.

$$\text{Single Layer Risk Value} = \sum_{k=1}^{n}(a_k w_k) \qquad \text{[Equation 1]}$$

Total Layer Risk Value = $L_1 w'_1 + L_2 w'_2 + \ldots L_6 w'_6$ $a_k = ODD_{element}$ $w_k$ = weight $L_k$ = Single Layer Risk Value In the present disclosure, the risk (total layer risk value) of the operation design domain situation recognized while driving the autonomous vehicle 100 corresponds to the sum of risks (single layer risk values) for each layer.

In addition, the risks (single layer risk values) for each layer are classified according to variables for each layer, and a weight is applied to the calculated attribute value (ODD-element).

The update module 111c updates the risk evaluation result by the risk calculation module 111b to the current operation design domain. The autonomous driving unit 112 drives the autonomous vehicle as the best scenario based on the risk included in the updated operation design domain (ODD).

Hereinafter, an embodiment of the above risk calculation and/or evaluation process will be described. However, the final risk is determined by the sum of risks for each layer, but the embodiment describes only some of layers selected from the entire 6-layers as an example.

Example 1

The risk according to a road structure (type) of road geometry layer can be calculated by applying different weights for each traffic accident, for example, a fatal accident, a serious accident, and a minor accident. In this case, the risk may be calculated by Equation 2 as follows.

$$\text{Risk} = \frac{\text{fatal accident} \times 1 + \text{serious accident} \times 0.7 + \text{minor accident} \times 0.3}{\text{number of traffic accidents}} \qquad \text{[Equation 2]}$$

In Equation 2 above, a weight of 1 was set for a fatal accident, a weight of 0.7 was set for a serious accident, and a weight of 0.3 was set for a minor accident.

In addition, the risk according to the accident severity according to the road type is calculated by applying the equivalent property damage only (EPDO) methodology for each average number of accidents. This is calculated by Equation 3 below.

$$EPDO(\text{by number of accidents}) = \frac{\text{death accident} \times 12 + \text{injury accident} \times 3}{\text{number of traffic accidents}} \qquad \text{[Equation 3]}$$

Here, a weight of 12 was applied to a fatal accident and a weight of 3 was applied to an injury accident.

The weights in Equation 2 and Equation 3 above are weights applied when the Road Traffic Authority selects accident-prone points. This is not limiting as applied to one example. In other words, the weight may be modified according to the designer's or operator's intention, traffic regulations, and characteristics of roads or regions.

Risk reflecting the result values of Equation 2 and Equation 3 above may be calculated as shown in Table 8 below.

Table 8 summarizes an example of calculating the fatality rate on a single road and intersection among road types, the risk according to traffic risk, and the risk according to EPDO (number of accidents).

TABLE 8

| Classification | | Traffic risk | EPDO |
|---|---|---|---|
| Single road | In tunnel | 9.91 | 7.12 |
| | On bridge | 8.13 | 5.75 |
| | On overpass | 7.51 | 5.38 |
| | Underpass | 7.33 | 4.93 |
| | Others (general) | 6.72 | 4.60 |
| Crossroad | 3-way | 6.80 | 4.51 |
| | 4-way | 6.96 | 4.72 |
| | Multiple | 6.75 | 4.69 |
| | Roundabout | 6.37 | 4.64 |
| Others•Auxiliary | | 6.05 | 0.19 |

The risk calculation module 111b evaluates the risk in consideration of both the above traffic risk and the result value of the EPDO, and reflects the evaluated risk when there is a difference from the existing operation design domain (ODD). Such an update of the operation design domain may change the set scenario according to the recognized risk.

For example, the scenario according to the existing operation design domain was set to reduce a driving speed of 100 km to 70% or less when a vehicle-to-vehicle distance is 50 M, but when the risk is evaluated as high in the updated operation design domain (ODD), the scenario may be changed to reduce the driving speed to 30% or less or to stop.

That is, the present disclosure may improve safety of autonomous driving by evaluating risk according to an operation design domain (ODD) situation of a road site and updating the operation design domain (ODD).

Example 2

In road shape elements, elements (attributes) that may affect vehicle driving safety are a curve radius and a longitudinal slope. Therefore, a risk calculation module calculates risk according to a curve radius through an accident modification factor according to the curve radius, which is calculated through the accident modification factor formula in Table 9.

TABLE 9

| Accident modification factor (risk) formula according to curve radius | Variable |
|---|---|
| $AMF_{curve\ radius} = 1.0 + 0.97(0.147V)^4 \frac{(1.47V)^2}{32.2R^2}\left[\frac{L_C}{L}\right]$ | V: Speed limit [mph]<br>Lc: Curve length [mile]<br>L: Section length [mile]<br>R: Curve radius [ft] |

In addition, the risk calculation module may calculate the risk through the accident modification factor according to the longitudinal slope. The accident modification factor according to the longitudinal slope is calculated through the formula in Table 10 below.

TABLE 10

| Formula | Variable |
|---|---|
| $AMF_{longitudinal\ slope} = c^{0.016\ g}$ or $c^{0.019\ g}$ | g: Longitudinal slope(%) |

Table 11 shows examples of values calculated according to curve radius and longitudinal slope.

TABLE 11

| Rule on Road Structure and Facility Standard | | Radius (m) | Longitudinal slope(%) |
|---|---|---|---|
| Highway | 120 km/h | 710 | 5 |
| | 110 km/h | 600 | |
| | 100 km/h | 460 | |
| Arterial road | 80 km/h | 280 | 7 |
| Local road | 50 km/h | 90 | 14 |

In addition, in order to calculate the risk grade by the curve radius on a highway with many vehicles driving at 100 km/h or more, the curve radius AMF scores obtained by calculating the accident modification factors for speeds of 110 km/h and 100 km/h are shown in Table 12 below.

TABLE 12

| Highway | Radius (m) | AMF(Accident Modification Factors) |
|---|---|---|
| 110 km/h | 600 | 1.7937 |
| | 693 | 1.5953 |
| | 849 | 1.3968 |
| | 1200 | 1.1984 |
| | — | 1.0000 |
| 100 km/h | 460 | 1.7622 |
| | 531 | 1.5716 |
| | 651 | 1.3811 |
| | 920 | 1.1905 |
| | — | 1.0000 |

In addition, the risk calculation module calculates the road type risk using the above curve radius and the longitudinal slope AMF score. The road type risk is calculated by Equation 4 below.

$$\text{Risk of road shape} = AMF_{curve\ radius} \times AMF_{longitudinal\ slope} \quad \text{[Equation 4]}$$

Therefore, the road type risk may be finally calculated as shown in Table 9 below. The table below evaluates a risk for each driving speed of 110 km/h and 100 km/h on the highway in the second lane. The higher the score, the higher the risk.

TABLE 13

| | Risk of road form in highway in second lane | | | | | | | | | |
|---|---|---|---|---|---|---|---|---|---|---|
| Highway | No. | Score | No. | Score | No. | Score | No. | Score | No. | Score |
| 110 km/h | 1 | 1.000 | 6 | 1.198 | 11 | 1.397 | 16 | 1.595 | 21 | 1.794 |
| | 2 | 1.024 | 7 | 1.227 | 12 | 1.430 | 17 | 1.634 | 22 | 1.837 |
| | 3 | 1.049 | 8 | 1.257 | 13 | 1.465 | 18 | 1.673 | 23 | 1.881 |
| | 4 | 1.074 | 9 | 1.287 | 14 | 1.500 | 19 | 1.713 | 24 | 1.926 |
| | 5 | 1.100 | 10 | 1.318 | 15 | 1.536 | 20 | 1.754 | 25 | 1.973 |
| 100 km/h | 1 | 1.000 | 6 | 1.191 | 11 | 1.381 | 16 | 1.572 | 21 | 1.762 |
| | 2 | 1.024 | 7 | 1.219 | 12 | 1.414 | 17 | 1.609 | 22 | 1.804 |
| | 3 | 1.049 | 8 | 1.248 | 13 | 1.448 | 18 | 1.648 | 23 | 1.848 |
| | 4 | 1.074 | 9 | 1.278 | 14 | 1.483 | 19 | 1.688 | 24 | 1.892 |
| | 5 | 1.100 | 10 | 1.309 | 15 | 1.519 | 20 | 1.728 | 25 | 1.938 |

Example 3

Risk that may be issued due to a road surface pavement material and road surface conditions occurs due to an increase in a stopping distance due to a change in frictional force of a road surface.

Therefore, the risk calculation module 111b calculates the risk through a stopping distance by applying friction coefficients for each road surface condition (drying, wetting, freezing). First, the stopping distance according to the road surface conditions for each driving speed is shown in Table 10 below.

TABLE 14

| Driving speed | Stopping distance [m] | | |
|---|---|---|---|
| [km/h] | Drying | Wetting | Freezing |
| 20 | 16.3 | 17.5 | 24.4 |
| 30 | 26.4 | 28.9 | 44.5 |
| 40 | 37.8 | 43.5 | 69.8 |
| 50 | 50.9 | 62.1 | 100.3 |
| 60 | 65.3 | 84.6 | 136.2 |
| 70 | 81.3 | 108.9 | 177.2 |
| 80 | 100.0 | 136.8 | 223.5 |
| 90 | 118.4 | 168.8 | 275.1 |
| 100 | 139.7 | 200.7 | 331.9 |
| 110 | 163.0 | 240.7 | 394.0 |
| 120 | 188.3 | 278.8 | 461.3 |

The driving speed [km/h] risk calculation module may set the risk higher as the stopping distance increases according to the driving speed and road surface condition.

In addition, the risk calculation module sums up the results of Examples 1 to 3 to finally calculate the risk for the currently detected state of the operation design domain (ODD). However, the above description is based on Examples 1 to 3 for convenience, and the final value for the actual risk is determined by the sum of the risks of all related layers according to the recognized ODD.

In addition, an update module 111c updates the operation design domain (ODD) according to the above risk. Therefore, a driving control unit 120 may control autonomous driving as a scenario suitable for the site according to the operation design domain (ODD) in which the risk is reflected by the update module 111c.

The control server 200 will be described in more detail with reference to FIGS. 4 and 5.

Figure 4:
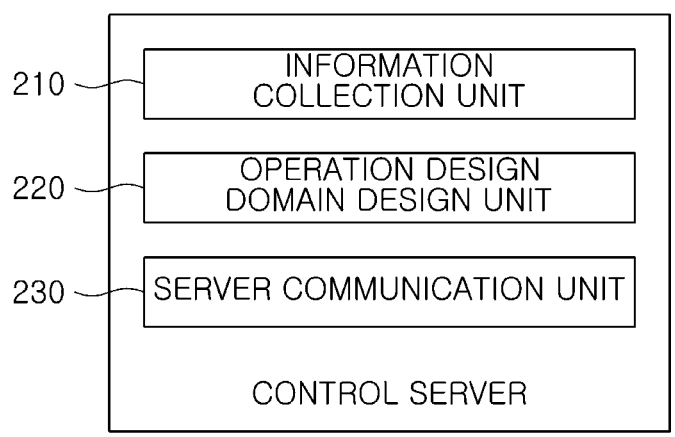
FIG. 4 is a block diagram illustrating a control server.
Figure 5:
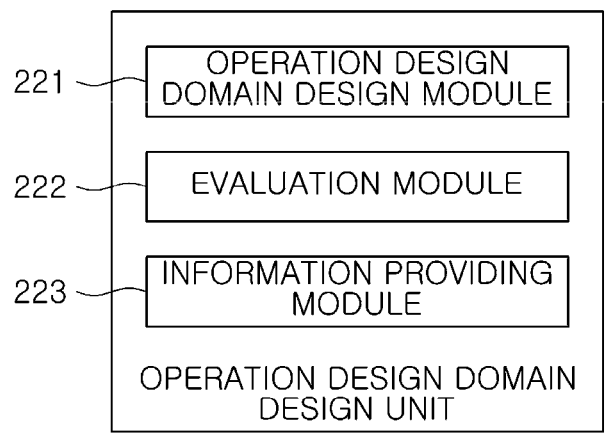
FIG. 5 is a block diagram illustrating an operation design domain design unit.

FIG. 4 is a block diagram illustrating a control server, and FIG. 5 is a block diagram illustrating an operation design domain design unit.

Referring to FIGS. 4 and 5, the control server 200 may include an information collection unit 210, an operation design domain design unit 220, and a server communication unit 130.

The information collection unit 210 collects information from a roadside unit 300 and an autonomous vehicle 100. The collected information may be information on operation design domain situations recognized while the autonomous vehicle 100 is driving on the road.

In addition, the information collection unit 210 is capable of collecting various information including the shared operation design domain and roadside and traffic conditions from the autonomous vehicle and the roadside unit.

The operation design domain design unit 220 models an operation design domain (ODD) including situations of ODDs (e.g., static ODD, dynamic ODD, or a combination of static and dynamic ODD) collected from autonomous vehicles.

To this end, the operation design domain design unit 220 may include an operation design domain design module 221, an evaluation module 222, and an information providing module 223.

The operation design domain design module 221 models a risk-based operation design domain (ODD). The process or method may be performed in the same way as the modeling process of the operation design domain (ODD) of the autonomous vehicle 100 described above (e.g., the sum of risks for each 6-layer).

The evaluation module 222 compares and evaluates the result values modeled by the operation design domain design module 221 and the operation design domains of the autonomous vehicles and the roadside units 300. Here, the evaluation module 222 compares the collected operation design domain (ODD) and the operation design domain (ODD) modeled by the operation design domain design module 221 to extract the operation design domain (ODD) in which the up-to-date update information such as risk evaluation is missing.

Alternatively, the evaluation module 222 compares the operation design domain design module 221 and the operation design domain (ODD) of the autonomous vehicle 100, and when the operation design domain (ODD) of the autonomous vehicle is more up-to-date information, updates the operation design domain designed by itself to the operation design domain (ODD) of the corresponding autonomous vehicle.

The information providing module 223 provides information to the autonomous vehicle 100 and the roadside unit 300. In this case, the provided information may include information including real-time accidents, traffic volume, weather, and the like, and up-to-date update information designed in the operation design domain design module.

In particular, the information providing module 223 may transmit the up-to-date update information of the operation design domain (ODD) to the autonomous vehicle 100 from which the up-to-date update information is missing in the previously collected operation design domain (ODD).

The present disclosure includes an autonomous driving method capable of updating an operation design domain (ODD) achieved through the above configuration. The autonomous driving method capable of updating an operation design domain will be described below.

Figure 6:
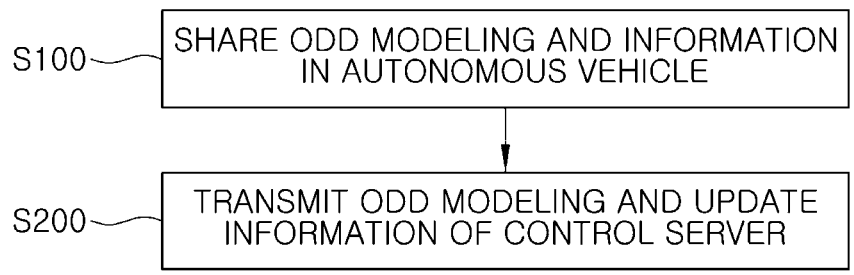
FIG. 6 is a flowchart illustrating an autonomous driving method of sharing a risk-based operation design domain according to the present disclosure.
Figure 7:
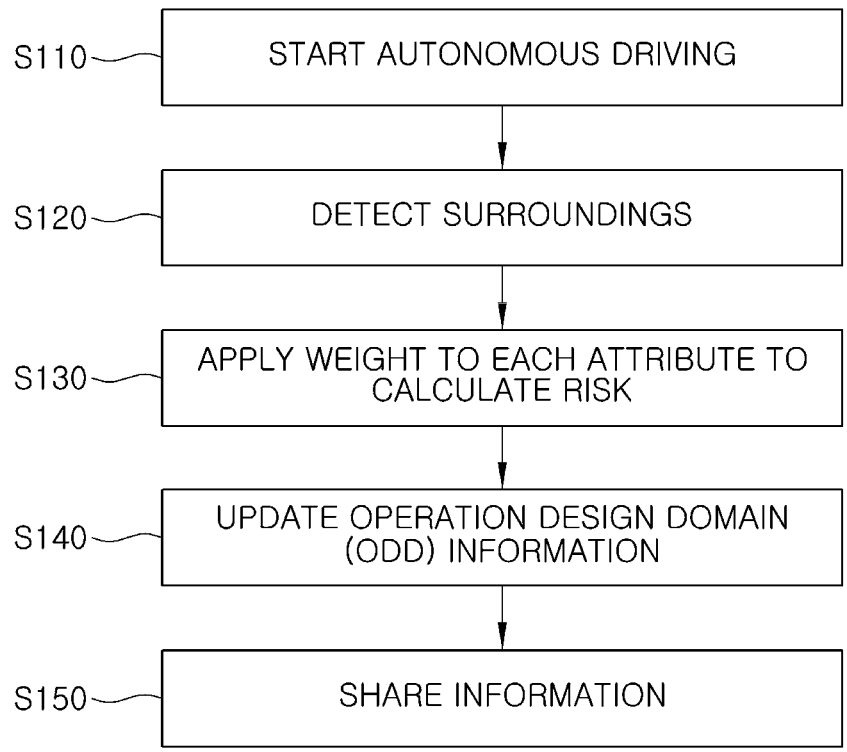
FIG. 7 is a flowchart illustrating step S100.

FIG. 6 is a flowchart illustrating an autonomous driving method capable of updating an operation design domain according to the present disclosure, and FIG. 7 is a flowchart illustrating step S100.

Referring to FIGS. 6 and 7, the present disclosure includes a step S100 of sharing ODD modeling and information in the autonomous vehicle 100 and a step S200 of transmitting ODD modeling and updated ODD modeling information of the control server 200.

Among those, step S100 is a step of evaluating the risk according to the operation design domain (ODD) recognized in the field by the autonomous vehicle 100, and thus, updating the operation design domain (ODD) to perform autonomous driving through a scenario according to the risk of the field situation.

Describing in more detail, step S100 includes step S110 of autonomous driving in the autonomous vehicle, step S120 of detecting surrounding situations and objects, step S130 of calculating risks for each layer set according to the situations recognized while driving, a step S140 of updating the risk-based operation design domain, and a step S150 of sharing update information.

Step S110 is a step of starting autonomous driving in the autonomous vehicle 100. The autonomous driving system sets a route according to the input destination and starts driving to a destination by controlling the vehicle driving unit 140.

Figure 9:
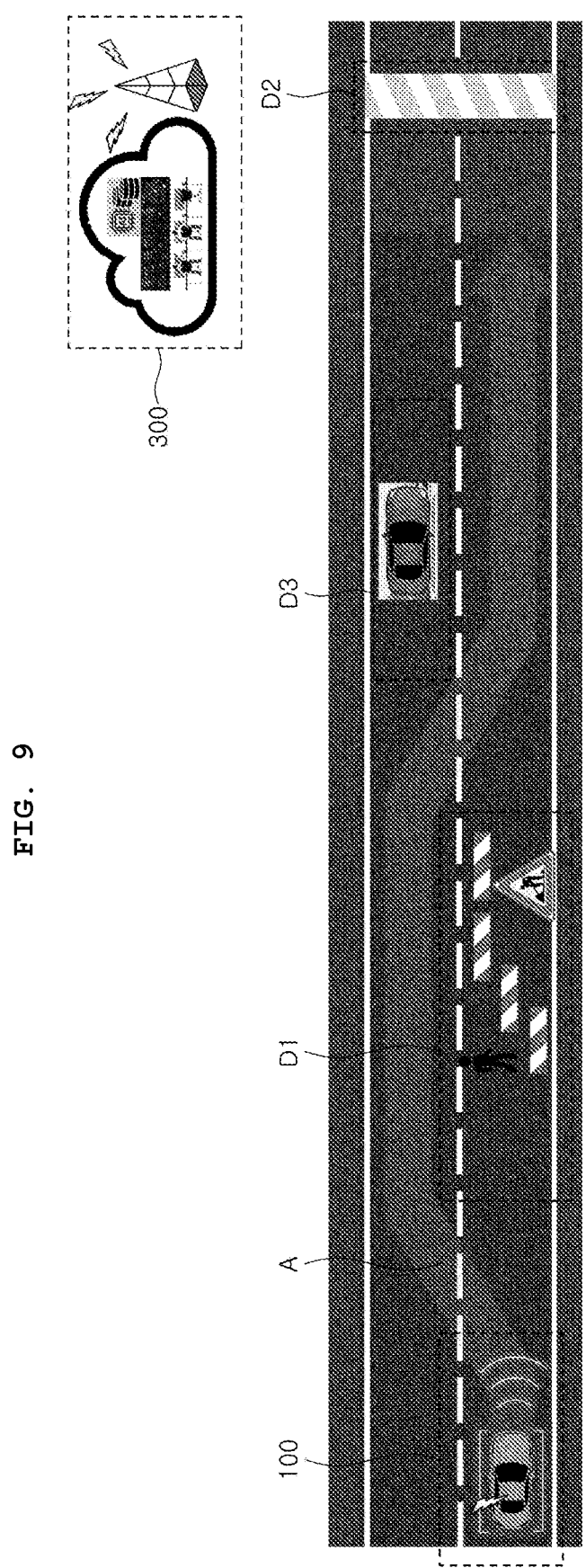
FIG. 9 is a diagram illustrating a response scenario according to an embodiment of the present disclosure.

Step S120 is a step of detecting an event defined in the operation design domain (ODD) while the autonomous vehicle 100 is driving. For example, as illustrated in FIG. 9, the autonomous vehicle 100 has a construction section D1 in which a worker is present in a front lane on which the autonomous vehicle 100 is driving, and an emergency stop vehicle D3 is present in front of the construction section, and detects a bump D2 on the front of the emergency stop vehicle.

Here, the construction section D1 corresponds to a dynamic ODD classified into a temporary restricted area, the emergency stop vehicle D3 corresponds to a dynamic ODD/event as an unexpected object, and the bump D2 corresponds to a static ODD as social infrastructure.

Step S130 is a step of calculating the risks for the static and dynamic ODDs in which the driving of the autonomous vehicle 100 is detected. For example, the construction section D1 is classified as the temporary restricted section, the emergency stop vehicle D3 is classified as an unexpected object, and the bump D2 is classified as a social infrastructure facility.

Therefore, the autonomous vehicle 100 searches for attributes for each layer classified into 6-layers, such as road surface condition of a road, structure, type, and weather of a road, and wind, and applies the set weight. The autonomous vehicle 100 calculates a final result value by summing the risks for each layer.

Step S140 is a step of updating the operation design domain based on risk in the autonomous vehicle 100. The autonomous vehicle 100 updates the previously installed operation design domain by applying the calculated risk.

For example, the updated operation design domain (ODD) included a higher grade risk than the front construction section D1 as the emergency stopped unexpected object D3 and the bump D2 continuously existed.

Therefore, when the autonomous driving system 110 is set to move and drive to the next car by decelerating to 80% when reaching set distance a of the corresponding point when there is a construction section in the front lane in the existing scenario, the autonomous driving system decelerates from a longer distance according to the risk grade and controls the driving in a scenario in which the vehicle passes the corresponding section while driving slowly at a speed of 10 km/h or less.

Step S150 is a step in which the autonomous vehicle 100 shares the updated operation design domain (ODD). The autonomous vehicle 100 transmits the updated operation design domain ODD to other surrounding autonomous vehicles 100, the roadside unit 300, and the control server 200. The transmitted information may be evaluated by the control server 200 and retransmitted to other autonomous vehicles 100 to be shared. Alternatively, the information is directly shared through one-to-one communication with other autonomous vehicles 100.

Step S200 will be described with reference to the flowchart of FIG. 8.

Figure 8:
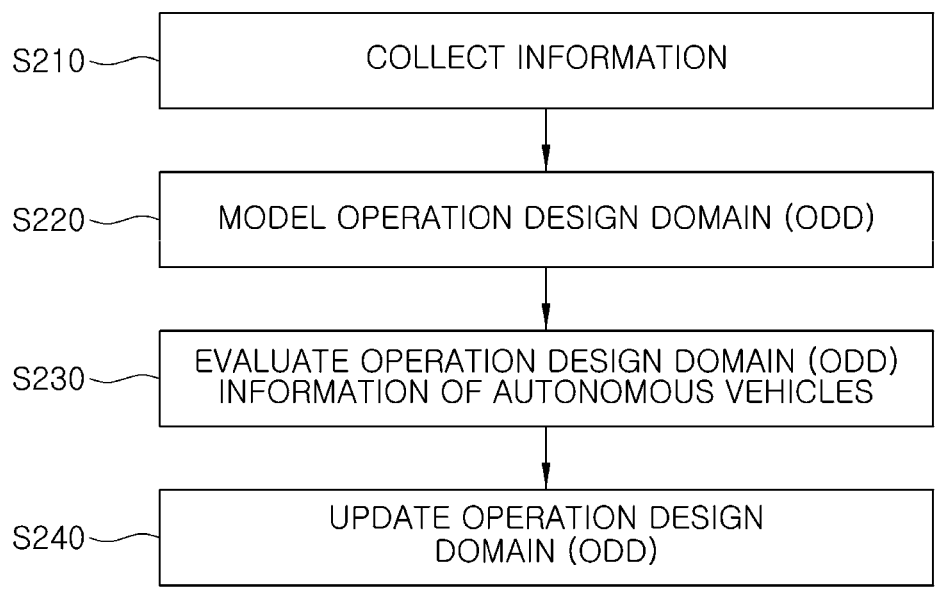
FIG. 8 is a flowchart illustrating step S200.

FIG. 8 is a flowchart illustrating step S200.

Referring to FIG. 8, step S200 includes step S210 of collecting, by the control server 200, information from the autonomous vehicle 100 and the roadside unit 300, step S220 of modeling the operation design domain, step S230 of evaluating the operation design domain of the autonomous vehicles 100, and step S240 of updating the operation design domain.

Step S210 is a step of collecting information from the control server 200. The control server 200 collects information such as traffic accidents, traffic volumes, and weather or events around roads, including the operation design domain (ODD), through infrastructure such as the autonomous vehicle 100 and the roadside unit 300.

Step S220 is a step of modeling, by the control server 200, the operation design domain. Here, the control server 200 designs and/or shares the operation design domain in various ways.

For example, before step S210, the control server 200 may model the operation design domain according to information of a specific road section and store the modeled operation design domain by itself.

Alternatively, the control server 200 may collect the information of the operation design domain (ODD) collected in step S210 to check whether there is an event on the road and the surrounding situation, and model the operation design domain according to the information of the section in which the event occurred.

Alternatively, the control server 200 may collect the road section and surrounding information (information classified into 6-layer layers and corresponding to attributes) collected through the infrastructure such as the plurality of autonomous vehicles 100 and roadside units 300 in step S210, model the operation design domain (ODD), and model the corresponding operation design domain whenever information different from the existing information is collected.

Step S230 is a step of evaluating, by the control server 200, whether the collected operation design domain of the autonomous vehicles 100 has been updated to the up-to-date information. As the autonomous vehicles 100 may have different operation design domains (ODD) installed depending on manufacturers and product specifications, the update to the static or dynamic operation design domain may be delayed due to the event, weather, or road type or structure.

Accordingly, the control server 200 may evaluate whether the operation design domain has been updated with the up-to-date information after collecting the operation design domain from the plurality of autonomous vehicles 100 in this way. In this case, the comparison target is either the operation design domain (ODD) modeled by itself through the information collected in real time from the control server 200 or the operation design domain according to the up-to-date road information collected from the autonomous vehicle 100, or compares and evaluates the collected operation design domains (ODDs) to derive the operation design domain (ODD) updated to the most up-to-date information.

Step S240 is a step of comparing and evaluating, by the control server 200, the collected operation design domains (ODDs) and transmitting the updated operation design domains to the autonomous vehicles 100 that have not been updated to the up-to-date information.

That is, the control server 200 may transmit the up-to-date operation design domain received through the operation design domain (ODD) modeled by itself or the infrastructure to other autonomous vehicles 100 to provide the up-to-date operation design domain (ODD) capable of responding to the static and dynamic operation design domains, such as an unexpected situation in a road or an unexpected object due to a surrounding situation.

Therefore, the present disclosure may solve the conventional problems of the autonomous vehicles 100, which are difficult to update due to various reasons such as systems or manufacturers, and create the safer autonomous driving environment.

According to the present disclosure, it is easy to update an operation design domain by evaluating risk according to road conditions recognized in real time in an autonomous vehicle, and to update the operation design domain regardless of a vehicle model, system specifications, and model year since the updated operation design domain may be shared with other autonomous vehicles and roadside units.

In addition, according to the present disclosure, it is easy to design an operation design domain that includes risk through information collected in real time from a control server communication-connected through infrastructure, and to update the operation design domain since the designed operation design domain may be shared with the autonomous vehicles and roadside units through the infrastructure.

The exemplary embodiments of the present disclosure have been described hereinabove, but those skilled in the art may variously modify and alter the present disclosure by adding, changing or deleting components without departing from the spirit and scope of the present disclosure defined in the claims, and it is to be considered that these modifications and alterations fall in the scope of the present disclosure.

What is claimed is:

1. An autonomous driving safety system for sharing a risk-based operation design domain, comprising:
   an autonomous driving system configured to control a vehicle driving unit according to information detected by a sensor unit to perform autonomous driving, wherein the autonomous driving system includes an operation design domain (ODD) update unit configured to evaluate a risk of at least one of a static operation design domain and a dynamic operation design domain recognized by the sensor unit while driving to update the operation design domain (ODD),
   wherein the autonomous driving system shares the updated operation design domain (ODD) with at least one of a roadside unit, other autonomous vehicles, and a control server, wherein the autonomous driving system includes:
      a layer-specific attribute information DB configured to layer the operation design domains (ODD) into a plurality of layers and stores attributes for each layer and weights set for each attribute; a risk calculation module configured to calculate risks for each layer by applying the weight of the attributes stored in the layer-specific attribute information DB according to the recognized operation design domain (ODD), and calculates a final risk by summing the risks for each layer; and an update module configured to update the risk calculated by the risk calculation module to the operation design domain (ODD), wherein the autonomous driving system is classified into: a road geometry layer that is classified into an operation design domain (ODD) of a road structure, a road type, a road shape and form, and a shape, type, and condition of a road surface; a social infrastructure layer that is classified into the operation design domain (ODD) of a traffic signal and structure; a temporary restricted area layer that is classified into an unexpected situation caused by a traffic accident, a construction section, and an emergency stop vehicle, and an operation design domain (ODD) of a protected zone; an object layer that is classified into an operation design domain (ODD) of a static object, a dynamic object, and an unexpected object on and around a road; an environmental condition layer that is classified into an operation design domain (ODD) of season, weather (climate), and a light source; and a connectivity (communication) layer that is classified into an operation design domain (ODD) of communication and control.

2. The autonomous driving safety system of claim 1, wherein the autonomous driving system shares the updated operation design domain (ODD) with at least one of a roadside unit, other autonomous vehicles, and a control server.

3. The autonomous driving safety system of claim 1, wherein the temporary restricted area layer has an attribute set as at least one of a distance between start and end points of the protected zone and the autonomous vehicle, a type of protected zone, a distance between an autonomous vehicle and an unexpected section, left and right lane positions between the unexpected sections from the autonomous vehicle, a relative position of the unexpected section from autonomous vehicle, and a type of the unexpected section.

4. The autonomous driving safety system of claim 1, wherein the operation design domain (ODD) of a type of the road structure has an attribute set as an accident rate and fatality, and the accident rate and fatality are weighted differently depending on a degree of death and injury.

5. The autonomous driving safety system of claim 1, wherein the operation design domain (ODD) of the road shape has an attribute set as at least one of a lane width, the total number of lanes on a road, a lane number on which the autonomous vehicle is driving, a radius of curvature of a road, and a road design speed.

6. The autonomous driving safety system of claim 1, wherein the operation design domain (ODD) of the road surface has an attribute set as at least one of a road surface material type, a road surface friction coefficient ($\mu$), a damage type, road surface damage severity (high, medium, low), and a distance between the autonomous vehicle and a road surface damage section.

7. The autonomous driving safety system of claim 1, wherein a risk of the operation design domain (ODD) of the type of the road structure is calculated according to Equation below:

$$\text{Risk} = \frac{\text{fatal accident} \times 1 + \text{serious accident} \times 0.7 + \text{minor accident} \times 0.3}{\text{number of traffic accidents}}$$

wherein a weight of 1 is set for a fatal accident, a weight of 0.7 is set for a serious accident, and a weight of 0.3 is set for a minor accident.

8. The autonomous driving safety system of claim 1, wherein the operation design domain (ODD) of the weather sets a cloud ratio, a wind speed, precipitation, snowfall, a visibility range as an attribute,
   the cloud ratio is set as a ratio occupied by clouds in sunny and cloudy conditions, wind, rain, and snow are classified and set into multiple categories based on the amount, and fog is classified into multiple types based on the visibility range.

9. The autonomous driving safety system of claim 1, wherein the object layer is classified into an operation design domain (ODD) of a vehicle, a pedestrian, and an animal, the operation design domain of the vehicle has an attribute set as at least one of left/right lane positions of a target vehicle from the autonomous vehicle, a surrounding position of the target vehicle from the autonomous vehicle, an absolute speed (X and Y axes), a relative speed (X and Y axes) from the autonomous vehicle, a distance (X and Y axes), a travel angle (direction), detection coordinates, and a type of a vehicle, and the operation design domain (ODD) of the pedestrian and animal has an attribute set as at least one of the relative speed, absolute speed, distance, travel angle, detection coordinates, and type from the autonomous vehicle.

10. The autonomous driving safety system of claim 1, wherein a risk of the operation design domain (ODD) of the road shape is calculated by Equation below: Risk of road shape=$AMF_{curve\ radius} \times AMF_{longitudinal\ slope}$ wherein the curve radius is a curve radius of a road, and the longitudinal slope is a longitudinal slope of a road.

11. An autonomous driving safety system of sharing a risk-based design domain, comprising: a control server configured to collect an operation design domain (ODD) from a plurality of autonomous vehicles 100 and roadside units in real time,
wherein the control server transmits an operation design domain (ODD) including risk to the plurality of autonomous vehicles and roadside units to update the operation design domain-,
wherein the control server receives the risk-based operation design domain from the autonomous vehicle, and compares and evaluates the collected operation design domain to transmit the updated operation design domain to the autonomous vehicle in which the risk is missing or erroneous.

12. The autonomous driving safety system of claim 11, wherein the control server includes: an information collection unit configured to collect an operation design domain (ODD) and road and surrounding situation information from the plurality of roadside units and autonomous vehicles;
an operation design domain design unit configured to model an operation design domain including at least one of a static operation design domain and a dynamic operation design domain collected from the autonomous vehicle; and a server communication unit configured to transmit the operation design domain (ODD) modeled by the operation design domain design unit to the plurality of autonomous vehicles and roadside units.

13. The autonomous driving safety system of claim 12, wherein the operation design domain design unit includes: an operation design domain design module configured to model the risk-based operation design domain (ODD); an evaluation module configured to compare and evaluate the operation design domain (ODD) modeled by the operation design domain design module and the operation design domain (ODD) collected from the autonomous vehicles and the roadside units to extract an operation design domain not including risk; and
an information providing module configured to transmit the updated operation design domain (ODD) to the autonomous vehicle and the roadside unit through the server communication unit.

14. An autonomous driving control method of sharing a risk-based design domain, comprising: recognizing an operation design domain (ODD) in real time while an autonomous vehicle is driving, evaluating risk, and updating the operation design domain; transmitting the operation design domain (ODD) updated by the autonomous vehicle to at least one of a control server, and other autonomous vehicles and roadside units 300 and sharing the operation design domain (ODD); and
collecting, by the control sever, the operation design domain (ODD) from the plurality of autonomous vehicles and roadside units in real time, evaluating and updating the risk of the collected operation design domain (ODD), and comparing and evaluating the collected operation design domain (ODD) to transmit the updated operation design domain to the autonomous vehicle and the roadside unit transmitting the operation design domain (ODD) in which the risk is missing or erroneous.

15. The autonomous driving control method of claim 14, wherein the recognizing comprises: autonomous driving in the autonomous vehicle; detecting an event defined in the operation design domain (ODD) while the autonomous vehicle is autonomously driving; calculating a risk of an event including at least one of a static operation design domain and a dynamic operation design domain detected while the autonomous vehicle is driving; and
calculating a risk of the operation design domain recognized by the autonomous vehicle to update the operation design domain, and performing autonomous driving through a scenario set as the updated operation design domain.

16. The autonomous driving control method of claim 14, further comprising:
receiving, by the control server, the updated operation design domain (ODD) and transmitting the updated operation design domain (ODD) to the other autonomous vehicles and roadside units.

* * * * *